(12) United States Patent
Kopec et al.

(10) Patent No.: US 6,234,132 B1
(45) Date of Patent: May 22, 2001

(54) INTAKE SYSTEM OF THERMOPLASTIC PLASTICS

(75) Inventors: Edvard Kopec, Ludwigsburg; Klaus Wachsmann, Erligheim; Volker Ernst, Sachsenheim; Rudolf Leipelt, Marbach, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/341,642
(22) PCT Filed: Jan. 12, 1998
(86) PCT No.: PCT/EP98/00121
   § 371 Date: Sep. 15, 1999
   § 102(e) Date: Sep. 15, 1999
(87) PCT Pub. No.: WO98/31925
   PCT Pub. Date: Jul. 23, 1998

(30) Foreign Application Priority Data

Jan. 15, 1997 (DE) .............................................. 197 01 118

(51) Int. Cl.$^7$ .................................................. F02M 35/10
(52) U.S. Cl. ................ 123/184.34; 123/184.55; 123/184.61
(58) Field of Search ................ 123/184.31, 184.34, 123/184.55, 184.61

(56) References Cited

U.S. PATENT DOCUMENTS

| 4,440,120 | * | 4/1984 | Butler | 123/184.34 |
| 5,542,711 | * | 8/1996 | Vaudry | 123/568 |
| 5,657,727 | * | 8/1997 | Uchida | 123/184.34 |

FOREIGN PATENT DOCUMENTS

| 4102453 | * | 7/1992 | (DE) . |
| 4403219 | * | 8/1995 | (DE) . |
| 201 180 | * | 11/1986 | (EP) . |
| 664 390 | * | 7/1995 | (EP) . |

OTHER PUBLICATIONS

Ponticel: "Vibration–Welded intake Manifolds" Manufacturing Solutions Apr. 1997.*

* cited by examiner

Primary Examiner—Noah P. Kamen
(74) Attorney, Agent, or Firm—Evenson, McKeown, Edwards & Lenahan, P.L.L.C.

(57) ABSTRACT

The invention concerns an intake system, in particular an intake pipe of thermoplastic plastics for the intake air of an internal combustion engine with in particular cylinder rows arranged in a V-shape. The intake system comprises at least two elements (10, 14), the first element (10) having a substantially closed shape and simultaneously forming the lower half-shell of the intake pipes. The second element (14) is designed as the upper half-shell of the intake pipes and is connected to the first element (10) by the plastics welding technique.

9 Claims, 3 Drawing Sheets

INTAKE SYSTEM OF THERMOPLASTIC PLASTICS

BACKGROUND OF THE INVENTION

The invention relates to an intake system made of thermoplastic synthetic resin material, especially for the air intake of an internal combustion engine.

It can be learned from the press release of Bayer AG of Nov. 3, 1993 that a simple method for the manufacture of air intake connections for passenger cars consists in making half-shells by the injection molding process. Two of these moldings are encased in plastic at the lines of contact in a second injection molding process such that a shape-conforming and air tight junction is produced. This method is said to have the advantage that parts having smooth surfaces are the result. The method has meantime been further developed and can be used in the meantime in a great number of intake tubes and intake systems. The friction welding process has also proven practical in addition to encasing.

In EP 5933 B1 an air intake tube is disclosed which likewise consists of two half shells. These are welded or cemented together. A disadvantage of this half-shell technique is that very complex tube geometries considerably complicate the joining of the half shells. Particularly where tubes cross over one another or intertwine with one another, joining them by encasing or friction welding is no longer possible. In these cases the technique of lost wax casting is used, which involves greater cost.

SUMMARY OF THE INVENTION

It is therefore the object of the invention to provide an air intake device made of thermoplastic synthetic resin material which, despite complicated shapes, can be manufactured by the half-shell technique. This object is achieved by the invention as described and claimed hereinafter.

An important advantage of the invention is that, first a first element is produced which has a substantially closed shape wherein the cavity is formed by the use of core elements. The first element is simultaneously the lower half shell of the air intake tube, so that a second element, which also is made by injection molding from a thermoplastic synthetic resin material, only forms the cover and the upper half shell of the air intake tube. The joining of the two elements is performed in an advantageous embodiment of the invention by friction welding. The cavity in the first element can be used as an air collector or air collecting chamber. But according to another embodiment of the invention it can be so configured that an additional, insertable element can be incorporated which serves to vary the intake tube length or intake tube openings into the air collecting chamber.

An advantageous embodiment of the invention provides for arranging additional switching elements, i.e., for coupling or uncoupling to the air intake tubes by a swinging or turning movement. It is thus possible to adjust the optimum air intake length according to the engine speed and load.

In an additional embodiment of the invention an air filter or additional air guiding devices are provided in the air collecting chamber.

These and additional features of preferred embodiments of the invention will be found not only in the claims but also in the description and the drawings, and the individual features can each be realized individually or together in the form of subcombinations in the embodiment of the invention and in other fields, and can constitute advantageous as well as independently patentable embodiments, for which protection is hereby claimed.

BRIEF DESCRIPTION OF THE DRAWINGS

The invention is further explained below with reference to illustrative embodiments shown in the accompanying drawings in which.

DETAILED DESCRIPTION OF PREFERRED EMBODIMENTS

Figure 1:
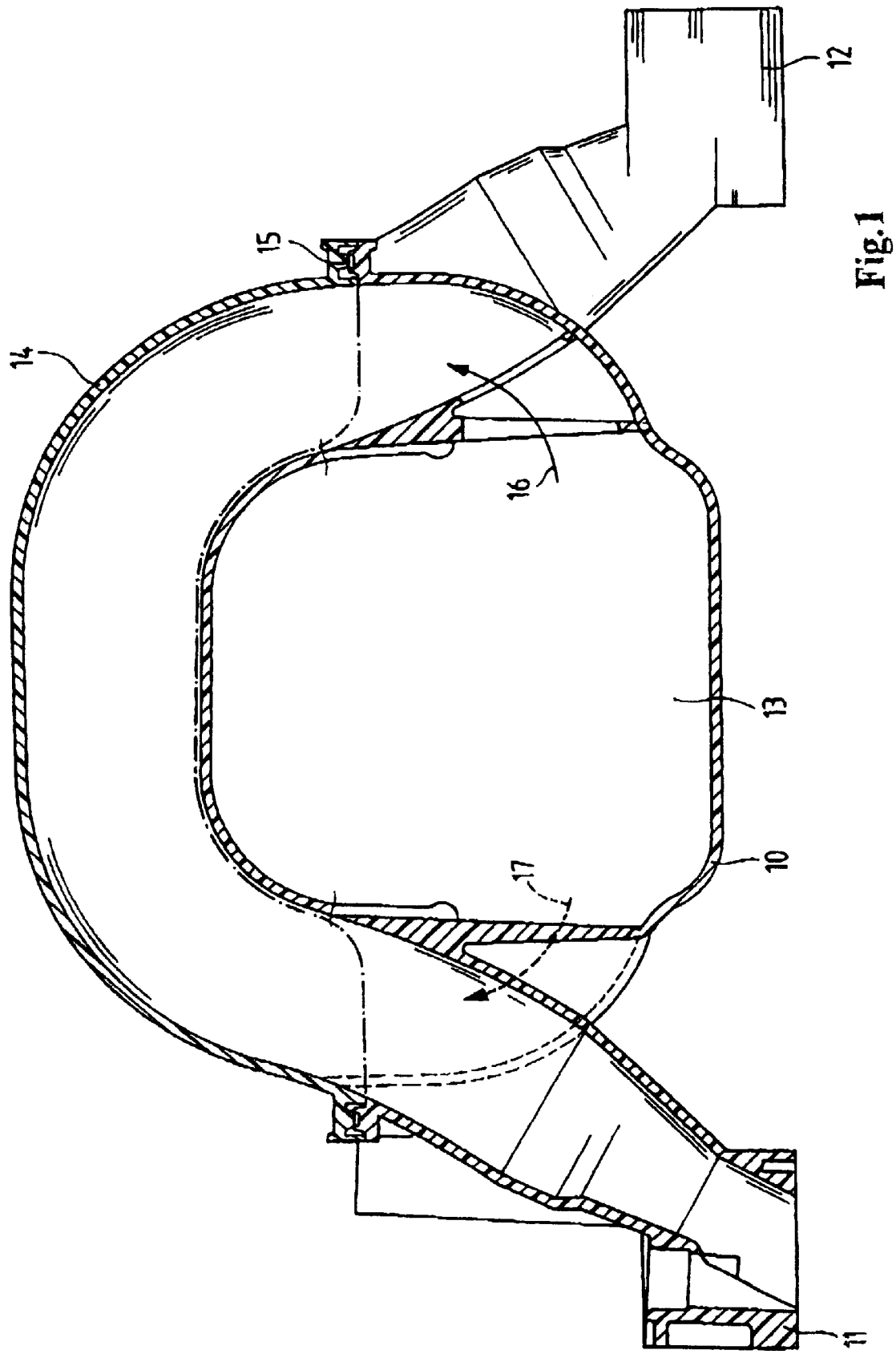
FIG. 1 shows a cross section through an air intake tube.

The air intake tube of FIG. 1 is a complete air intake distributor or air intake system for an internal combustion engine with the rows of cylinders arranged in a V-shaped configuration. The air intake system is situated in a conventional manner between the two rows of cylinders and comprises a first element 10 which has a left connecting flange 11 and a right connecting flange 12.

The air intake system is fastened by the two flanges to the cylinder heads of the internal combustion engine. The element 10 has a substantially closed form. The cavity 13 serves as an air collecting chamber to which clean combustion air is fed through a preceding filter which is not shown. A cover 14 is joined to the element 10 through a circumferential plastic welded connecting surface 15. The dividing line between the element 10 and the cover 14 is indicated by broken lines in FIG. 1. The two cooperating elements form air intake tubes which carry the aspirated air indicated by arrows 16 and 17 from the cavity 13 to the connecting flanges 11 and 12.

Figure 2:
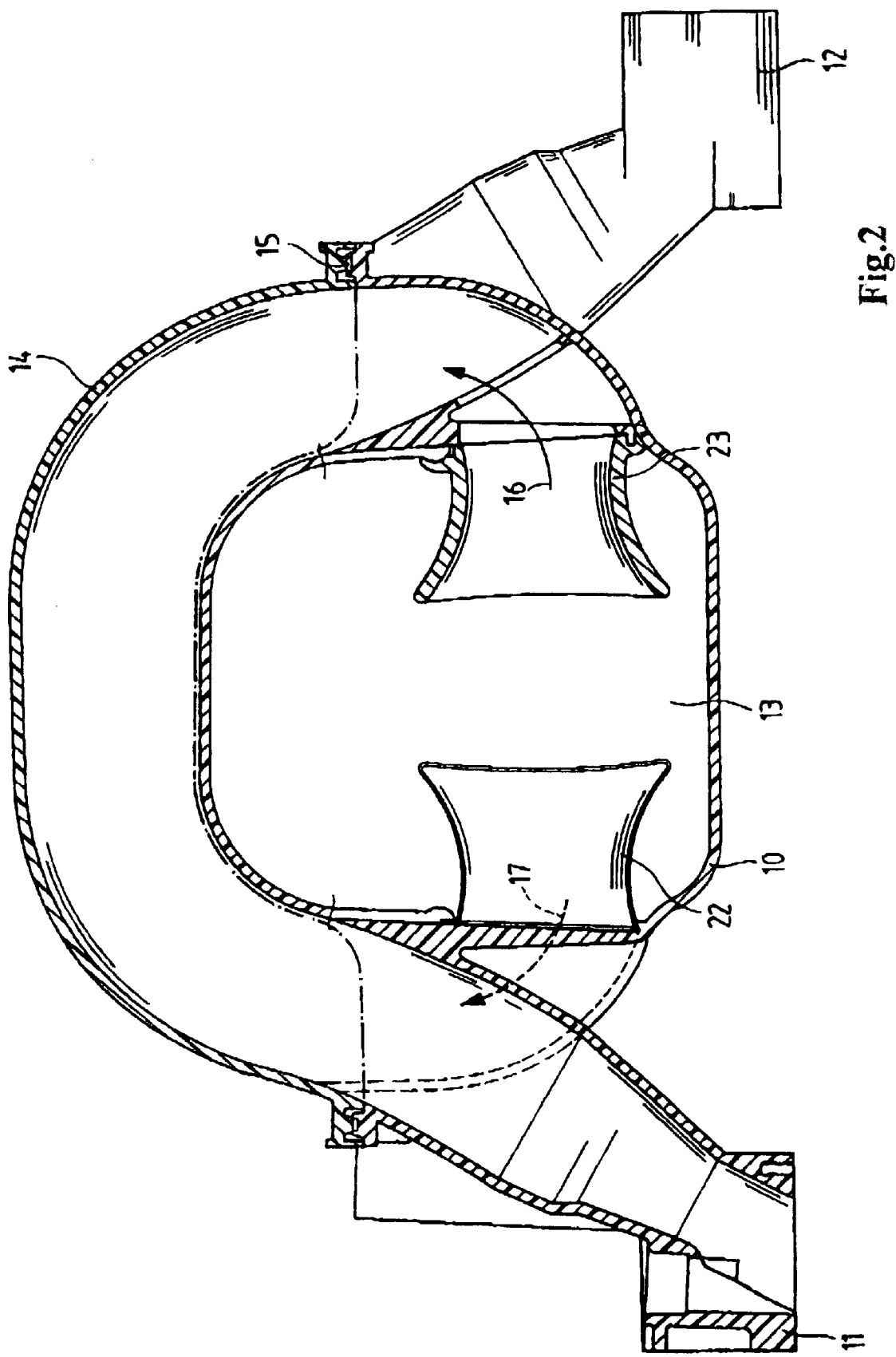
FIG. 2 shows an air intake tube with changed tube length.

FIG. 2 shows an air intake tube which is constructed similarly to the one in FIG. 1. To increase the effective intake tube length, two additional parts are situated in the cavity 13. The two additional parts are each inserted into the cavity and also are made of a thermoplastic synthetic resin material. The connection to the element 10 is accomplished by ultrasonic welding or by simple snap fastening technology.

The advantage of using such end pieces for the intake tubes is that the intake tube length can be varied within certain limits, and thus the air intake system can be tuned to the requirements of the particular internal combustion engine.

Figure 3:
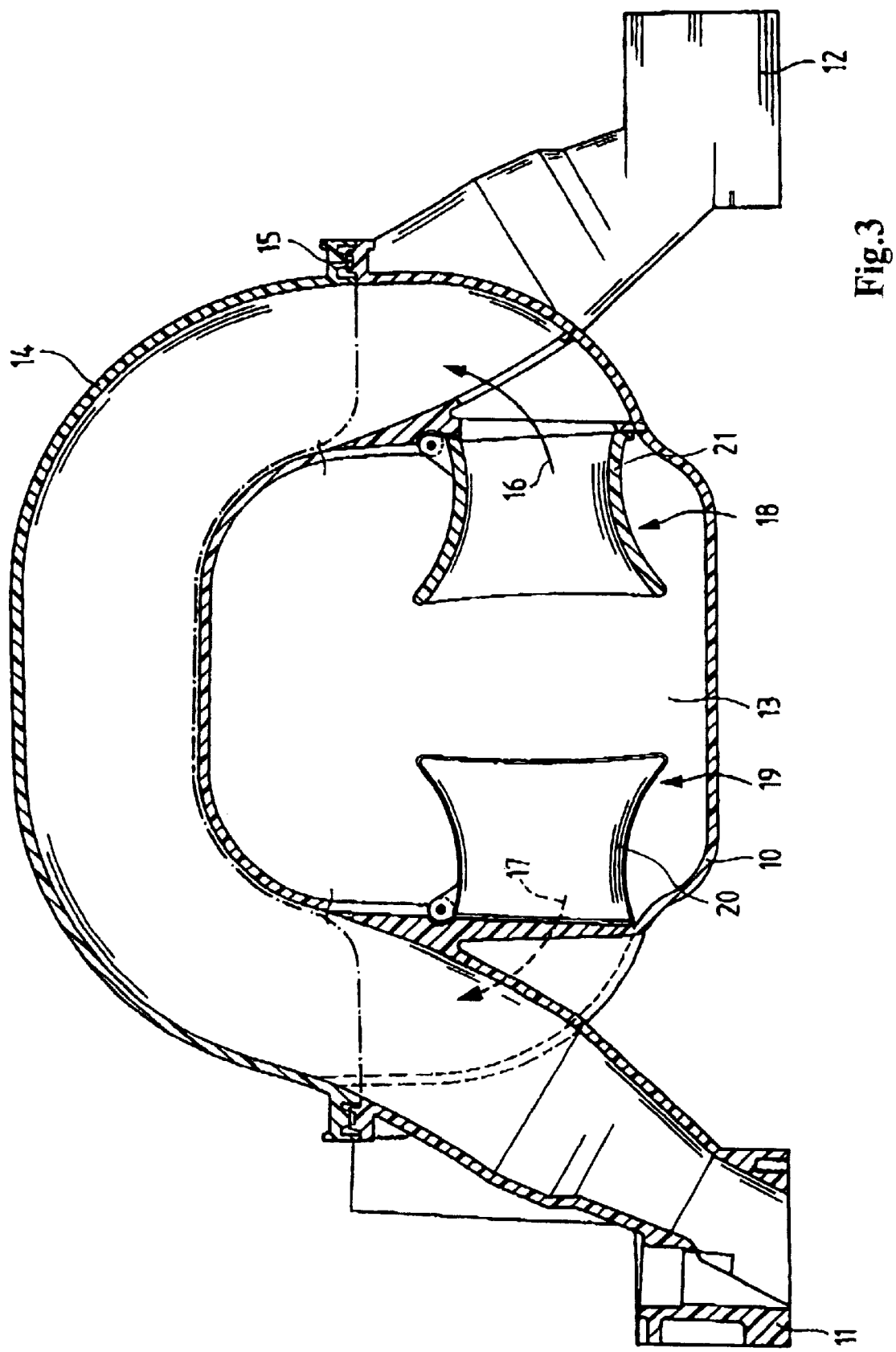
FIG. 3 shows an air intake tube with variable tube length.

FIG. 3 shows an air intake system having important features of the system shown in FIG. 1. Here, however, the possibility exists for varying the intake tube length using two additional switching parts in accordance with the speed of the internal combustion engine. The switching elements 18 and 19 are inserted into element 10 or connected to it, at least one part of the switching elements being mounted so that it can be pivoted. In the example shown here, these are the parts 20 and 21. In the position shown, the lengthening of the intake tube by the switching elements is active. The turning parts 20 and 21 can be pivoted upward and thus decrease the effective intake tube length.

Drawing Reference List 10 element
11 connecting flange
12 connecting flange
13 cavity
14 cover
15 welded junction 16 arrow
17 arrow
18 switching element
19 switching element
20 turning part
21 turning part
22 additional part
23 additional part

What is claimed is:

1. An air intake system for supplying intake air to an internal combustion engine having two rows of cylinders arranged in a V-shape, said air intake system comprising at least one air intake tube for each cylinder of said engine, wherein said air intake tubes are made of thermoplastic synthetic resin material, said air intake tubes being assembled from a first element which forms a lower half shell of each tube and a second element which forms an upper half shell of each tube, said first and second elements being joined to each other by plastic welding, wherein said first element also forms a substantially closed air collection chamber which communicates with the intake tubes so that air can be supplied from said collection chamber through the intake tubes to respective cylinders of the engine, and wherein said air intake system comprises a pair of connecting flanges arranged substantially symmetrically on opposite sides of the air intake system for attachment to respective rows of cylinders of the internal combustion engine to connect the air intake tubes to the respective cylinders of the engine.

2. An air intake system according to claim 1, wherein said second element simultaneously forms a cover over the intake tubes.

3. An air intake system according to claim 1, wherein said air collection chamber is formed by injection molding said first element of thermoplastic synthetic resin material around a core element, followed by removal of the core element from the molded first element transversely of the air intake tubes.

4. An air intake system according to claim 1, wherein said second element is supported on said first element.

5. An air intake system according to claim 1, further comprising at least one tube extension member in said air collection chamber which varies a respective intake tube in length.

6. An air intake system according to claim 5, wherein each tube extension member is inserted into an end of the respective air intake tube.

7. An air intake system according to claim 5, wherein each tube extension member is selectively connectable to or separable from the respective intake tube.

8. An air intake system according to claim 7, wherein each tube extension member is mounted in said first element so as to be pivotable between a first position in which it extends the respective intake tube in length and a second position in which it is moved away from the respective intake tube.

9. An air intake system according to claim 1, further comprising an air filter for filtering air in said air collection chamber.

\* \* \* \* \*